United States Patent
Kao et al.

(10) Patent No.: US 11,068,800 B2
(45) Date of Patent: Jul. 20, 2021

(54) NEARLINE UPDATES TO PERSONALIZED MODELS AND FEATURES

(71) Applicant: Microsoft Technology Licensing, LLC, Redmond, WA (US)

(72) Inventors: Kevin Kao, San Jose, CA (US); Benjamin Hoan Le, San Jose, CA (US); Vijay K. Dialani, Fremont, CA (US); Parul Jain, Cupertino, CA (US); Caleb T. Johnson, Santa Clara, CA (US); Anthony D. Duerr, Castro Valley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 521 days.

(21) Appl. No.: 15/844,915

(22) Filed: Dec. 18, 2017

(65) Prior Publication Data

US 2019/0188591 A1    Jun. 20, 2019

(51) Int. Cl.
*G06F 17/10*    (2006.01)
*G06N 7/00*    (2006.01)
(Continued)

(52) U.S. Cl.
CPC ........... *G06N 7/005* (2013.01); *G06F 16/955* (2019.01); *G06F 17/18* (2013.01); *G06N 3/08* (2013.01); *G06Q 10/0631* (2013.01)

(58) Field of Classification Search
CPC ........ G06Q 50/01; G06Q 30/02; G06Q 10/10; G06Q 30/0269; G06Q 30/0631; G06Q 30/0201; G06Q 30/0251; G06Q 30/0255; G06Q 30/0277; G06Q 30/0261; G06Q 30/0241; G06Q 30/0601; G06Q 30/0282; G06Q 10/06; G06Q 50/22; G06Q 10/1053; G06Q 30/0256; G06Q 30/0242; G06Q 30/0271
See application file for complete search history.

(56) References Cited

U.S. PATENT DOCUMENTS

2006/0229896 A1*  10/2006  Rosen ................ G06Q 10/1053
                                                      705/321
2015/0112765 A1*  4/2015  Sundaresh ............. G06Q 50/01
                                                      705/7.31
(Continued)

OTHER PUBLICATIONS

Amatriain et al. System Architectures for Personalized and Recommendation Netflix Techonology Blog, Mar. 2013 (Year: 2013).*
(Continued)

*Primary Examiner* — Rehana Perveen
*Assistant Examiner* — Cuong V Luu
(74) *Attorney, Agent, or Firm* — Schwegman Lundberg & Woessner, P.A.

(57) ABSTRACT

The disclosed embodiments provide a system for processing data. During operation, the system obtains events reflecting responses by a user to job recommendations outputted to the user. Next, the system updates a set of features for the user from the events. The system then includes the updated set of features in a feature repository for use by a statistical model in generating a ranking of jobs for the user. Finally, the system retrains the statistical model using the events prior to using the statistical model to update the outputted job recommendations using the ranking.

18 Claims, 5 Drawing Sheets

(51) Int. Cl.
  *G06N 3/08* (2006.01)
  *G06Q 10/06* (2012.01)
  *G06F 17/18* (2006.01)
  *G06F 16/955* (2019.01)

(56) References Cited

U.S. PATENT DOCUMENTS

| | | | |
|---|---|---|---|
| 2015/0379429 A1* | 12/2015 | Lee | G09B 5/00 706/11 |
| 2016/0180248 A1* | 6/2016 | Regan | G09B 5/00 706/12 |
| 2016/0261544 A1* | 9/2016 | Conover | H04L 67/306 |
| 2016/0267544 A1* | 9/2016 | Flood | H04L 67/306 |
| 2017/0024656 A1* | 1/2017 | Gilon | G16H 20/10 |
| 2018/0181667 A1* | 6/2018 | Kolb | G06F 16/9024 |
| 2018/0232751 A1* | 8/2018 | Terhark | G06N 7/005 |

OTHER PUBLICATIONS

Amatrian Big & Personal: data and models behind Netflix recommendations Proceedings of the 2nd International Workshop in Big Data, Streams and Heterogeneous, Aug. 2013 (Year: 2013).*
Ahmed et al. Use Interaction Analysis to Recommend Suitable Jobs in Career-Oriented Social Networking Sites, IEEE (Year: 2016).*

* cited by examiner

NEARLINE UPDATES TO PERSONALIZED MODELS AND FEATURES

BACKGROUND

Field

The disclosed embodiments relate to statistical models and features. More specifically, the disclosed embodiments relate to techniques for performing nearline updates to personalized models and features.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

However, significant increases in the size of data sets have resulted in difficulties associated with collecting, storing, managing, transferring, sharing, analyzing, and/or visualizing the data in a timely manner. For example, conventional software tools and/or storage mechanisms may be unable to handle petabytes or exabytes of loosely structured data that is generated on a daily and/or continuous basis from multiple, heterogeneous sources. Instead, management and processing of "big data" may require massively parallel software running on a large number of physical servers and/or nodes, as well as synchronization among the servers and/or nodes.

Consequently, big data analytics may be facilitated by mechanisms for efficiently and/or effectively collecting, storing, managing, compressing, transferring, sharing, analyzing, and/or visualizing large data sets.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
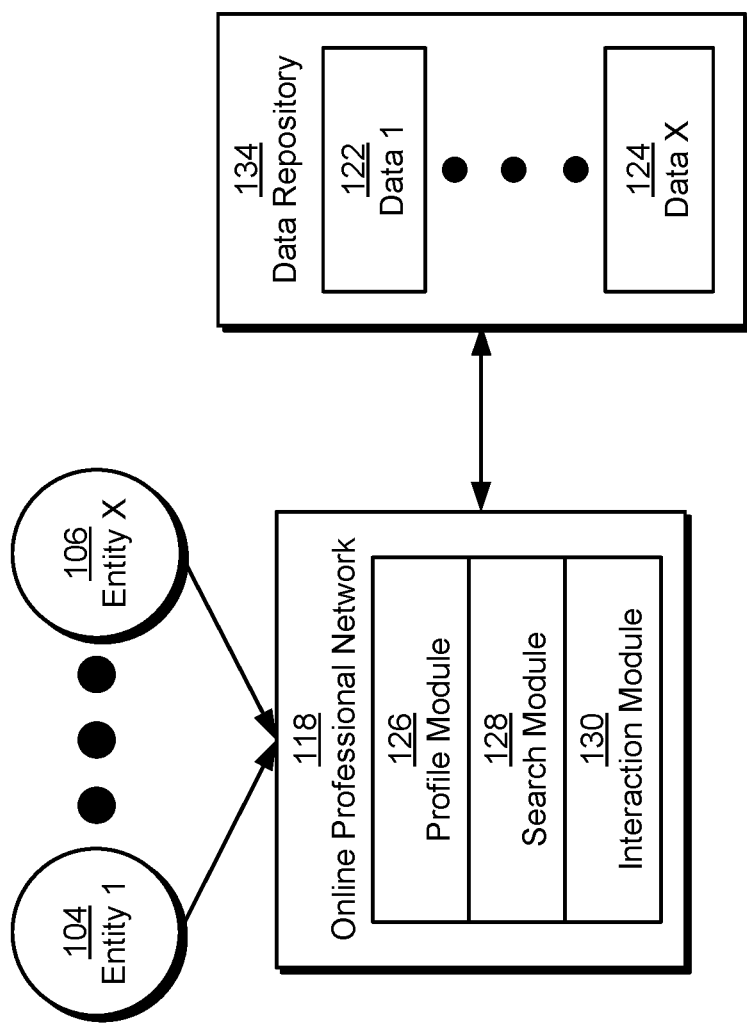
FIG. 1 shows a schematic of a system in accordance with the disclosed embodiments.

The disclosed embodiments provide a method, apparatus, and system for processing data. As shown in FIG. 1, the data may be associated with a user community, such as an online professional network 118 that is used by a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use online professional network 118 to list jobs, search for potential candidates, provide business-related updates to users, advertise, and/or take other action.

More specifically, online professional network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online professional network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online professional network 118 also includes a search module 128 that allows the entities to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature in online professional network 118 to search for profiles, jobs, and/or information by categories such as first name, last name, title, company, school, location, interests, relationship, skills, industry, groups, salary, experience level, etc.

Online professional network 118 further includes an interaction module 130 that allows the entities to interact with one another on online professional network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online professional network 118 may include other components and/or modules. For example, online professional network 118 may include a homepage, landing page, and/or content feed that provides the latest posts, articles, and/or updates from the entities' connections and/or groups to the entities. Similarly, online professional network 118 may include features or mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online professional network 118 may be tracked and stored in a database, data warehouse, cloud storage, and/or other data-storage mechanism providing data repository 134.

In one or more embodiments, data in data repository 134 is used to generate job recommendations within online professional network 118. For example, one or more components of the online professional network may track searches, clicks, views, text input, conversions, and/or other feedback during the entities' interaction with a job search tool in the online professional network. The feedback may be stored in data repository 134 and used as training data for one or more statistical models, and the output of the statistical model(s) may be used to display and/or otherwise recommend a number of job listings to current or potential job seekers in the online professional network.

In one or more embodiments, job recommendations and/or other recommendations in online professional network 118 are generated using nearline updates to personalized relevance models and features inputted into the relevance models. For example, a personalized statistical model may be used to generate and/or rank job recommendations for a user as the user browses and/or searches for job listings in online professional network 118. As the user's responds to the job listings (e.g., by saving or dismissing a job listing and/or providing a reason for saving or dismissing the job listing), the user's responses are used to update the personalized statistical model and/or features inputted into the personalized statistical model. In turn, subsequent recommendations displayed to the user (e.g., during the same user session with online professional network 118) may reflect the user's responses and/or preferences with respect to previous recommendations.

Figure 2:
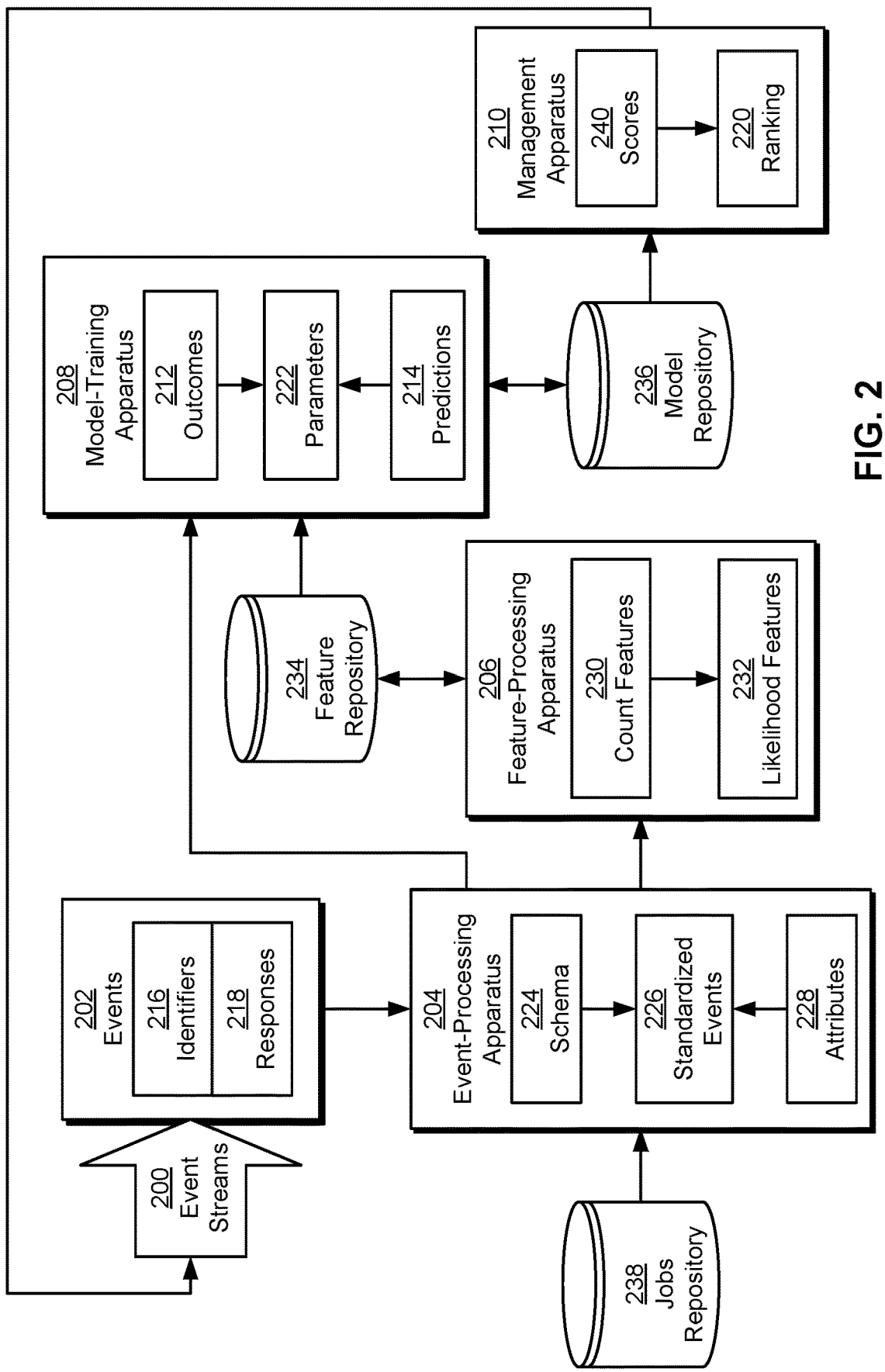
FIG. 2 shows a system for processing data in accordance with the disclosed embodiments.

FIG. 2 shows a system for processing data in accordance with the disclosed embodiments. More specifically, FIG. 2 shows a system for performing nearline updates to personalized statistical models and features. As shown in FIG. 2, the system includes an event-processing apparatus 204, a feature-processing apparatus 206, a model-training apparatus 208, and a management apparatus 210. Each of these components is described in further detail below.

Event-processing apparatus 204 may receive events 202 from a number of event streams 200. Each event may represent a record of activity within a monitored system. For example, events 202 in event streams 200 may include records of user responses 218 to job recommendations and/or other types of recommendations within or outside a social network, such as online professional network 118 of FIG. 1. As a result, events 202 may identify responses 218 (e.g., acceptances, rejections, likes, dislikes, ignores, impressions, clicks, saves, comments, shares, hides, messages, searches, etc.) and/or reasons for responses 218 (e.g., lack of relevance, specific attributes in the recommendations, etc.). Events 202 may also include one or more identifiers 216 associated with responses 218, such as an identifier for a user from which a response was received (e.g., a member of an online professional network) and/or an identifier for a recommendation (e.g., job, post, article, profile edit, search term, etc.) to which the response was made.

To receive events 202 from event streams 200, event-processing apparatus 204 may subscribe to event streams 200. For example, event-processing apparatus 204 may subscribe to one or more event streams 200 containing records of user responses 218 to recommendations, content, and/or features. Such events 202 and/or event streams 200 may be generated and/or maintained using a distributed streaming platform such as Apache Kafka (Kafka™ is a registered trademark of the Apache Software Foundation). In turn, event-processing apparatus 204 may receive events 202 from event streams 200 on a nearline basis (e.g., after the events are generated in response to user activity and/or database changes).

After events 202 are received, event-processing apparatus 204 uses a schema 224 to generate standardized events 226 from events 202. For example, event-processing apparatus 204 may use schema 224 to convert events 202 from multiple event streams 200 and/or in different formats into a set of standardized events 226 that adhere to a unified format.

An exemplary schema 224 for generating standardized events 226 may include the following:

```
{
    "type": "record",
    "name": "CareersRelevanceActivityEvent",
    "fields": [
        {
            "name": "timestamp",
            "type": "long"
        },
        {
            "name": "memberUrn",
            "type": "urn"
        },
```

-continued

```
    {
        "name": "jobUrn",
        "type": "urn"
    },
    {
        "name": "action",
        "doc": "DISMISS, INTERESTED, SAVE, etc",
        "type": "enum"
    },
    {
        "name": "reasons",
        "type": {
            "type": "array",
            "items": {
                "type": "enum"
            }
        }
    },
    {
        "name": "source",
        "type": "enum"
    },
    {
        "name": "channel",
        "type": "enum"
    },
    {
        "name": "position",
        "type": "int"
    }
    ]
}
```

The exemplary schema 224 has a name of "CareersRelevanceActivityEvent" and a type of "record." The exemplary schema 224 also specifies a set of required fields and the associated types, including a timestamp, a user identifier for a user ("memberUrn"), a job identifier for a recommended job ("jobUrn"), a response of the user to the job ("action"), and one or more reasons for the response. The last three fields of schema 224 ("source," "channel," "position") identify the location of the user's impression of the job recommendation.

Event-processing apparatus 204 also uses identifiers 216 in events 202 to retrieve attributes 228 associated with the corresponding recommendations and enrich standardized events 226 with attributes 228. For example, event-processing apparatus 204 may match a job identifier in each event to a corresponding job record in a jobs repository 238. Event-processing apparatus 204 may retrieve, from the job record, attributes 228 such as a job title, company, required or desired skills, location, industry, seniority, and/or member segment (e.g., a group of users that share one or more common attributes 228). In another example, event-processing apparatus 204 may match a member identifier in an event to profile data (e.g., name, location, industry, profession, skills, work experience, education, etc.) for a member of the social network and "decorate" the event with the profile data. Event-processing apparatus 204 may then add some or all attributes 228 to the event and/or another record that is linked to the event.

After standardized events 226 are generated (e.g., on an individual or batch basis), event-processing apparatus 204 may emit standardized events 226 in one or more additional event streams. In turn, feature-processing apparatus 206 may receive standardized events 226 from the event streams on a nearline basis (e.g., by subscribing to the event streams) and use standardized events 226 to update features for the corresponding users, recommendations, and/or other entities associated with standardized events 226.

More specifically, feature-processing apparatus 206 aggregates standardized events 226 into count features 230 for the corresponding identifiers 216, responses 218, and/or attributes 228. Count features 230 include counts of various types of responses 218 to attributes 228 by users. For example, feature-processing apparatus 206 may aggregate standardized events 226 by users, responses 218, and/or attributes 228 in standardized events 226. The counts may then be used to update a set of count features 230 for the user.

An exemplary set of count features 230 may include the following:

| memberEntity | response | jobEntity | (count) |
| --- | --- | --- | --- |
| urn:li:member:1 | DISMISS | urn:li:title:9 | 4 |
| urn:li:member:1 | SAVE | urn:li:title3 | 2 |

In the exemplary count features 230 above, a member with a member identifier of 1 has a count of 4 for dismissals of a job title with a job identifier of 9. The same member has a count of 2 for saves of a job title with a job identifier of 3. Each count feature may be monotonically increasing, such that each new response of the member to a given attribute may be used to increment a "count" field in a record storing a count feature that is identified by the member, response, and attribute.

Feature-processing apparatus 206 additionally uses standardized events 226 and/or count features 230 to generate and/or update a set of likelihood features 232 for the corresponding users and/or attributes 228. Each likelihood feature may represent the likelihood that a specific user has a certain response to a certain attribute. In turn, the likelihood feature may be calculated by dividing the count of the member's response to the attribute by the count of all responses made by the member to the attribute. Calculation of the likelihood feature may optionally be delayed until the member has generated a certain number of responses to a given attribute.

For example, a member that dismisses 10 recommendations for jobs at a given company out of 20 overall responses to recommendations for jobs at the company may have a 0.5 likelihood of dismissing recommendations for jobs at the company. When a batch of standardized events 226 includes five additional dismissals of jobs at the company by the member and no other responses to jobs at the company by the member, feature-processing apparatus 206 may update the likelihood to (10+5)/(20+5), or 0.6.

After count features 230 and likelihood features 232 are generated and/or updated using a given set of standardized events 226, feature-processing apparatus 206 stores count features 230 and likelihood features 232 in a feature repository 234. Count features 230 and likelihood features 232 may then be queried from feature repository 234 on an online, nearline, and/or offline basis. For example, count features 230 and/or likelihood features 232 may be used to perform training, testing, validation, and/or scoring of one or more statistical models.

Model-training apparatus 208 uses events 202 from event streams 200 and/or features in feature repository 234 to train and/or retrain a statistical model for generating the recommendations. Such model training can be performed independently of the operation of feature-processing apparatus 206. For example, model-training apparatus 208 and feature-processing apparatus 206 may both operate on standardized events 226 from event-processing apparatus 204 instead of requiring feature-operating apparatus 206 to update a set of features using standardized events 226 before model-training apparatus 208 retrains the statistical model using the updated features.

To train or retrain a statistical model, model-training apparatus 208 may obtain parameters 222 for the statistical model from a model repository 236. For each new set of standardized events 226 associated with the statistical model (e.g., a user to which the statistical model is personalized), model-training apparatus 208 uses the statistical model to generate a set of predictions 214 for the corresponding attributes 228. For example, model-training apparatus 208 may input likelihood features 232 for attributes 228 (e.g., job title, company, skills, location, industry, and/or seniority) associated with a job into a logistic regression model to obtain a prediction representing the likelihood that the user has a positive response (e.g., like, save, apply, etc.) to a recommendation of the job.

Model-training apparatus 208 then uses predictions 214 and outcomes 212 associated with events 202 (i.e., responses 218 specified in events 202) to update parameters 222 of the statistical model. For example, model-training apparatus 208 may use the following rule to update parameters 222:

$$\beta_i(t+1)=\beta_i(t)+\text{learning\_rate}*(y-\hat{y})*\hat{y}*(1-\hat{y})*x_i$$

In the above rule, $\beta_i(t)$ represents the $i^{th}$ coefficient of a logistic regression model, $\beta_i(t+1)$ represents the update to the coefficient, $\hat{y}$ represents predictions 214, y represents outcomes 212, and $x_i$ represents one or more features used with the coefficient.

After parameters 222 are updated, model-training apparatus 208 stores parameters 222 in model repository 236. For example, model-training apparatus 208 may replace old values of parameters 222 in model repository 236 with the updated parameters 222, or model-training apparatus 208 may store the updated parameters 222 separately from the old values (e.g., by storing each set of parameters 222 with a different version of the statistical model).

Finally, management apparatus 210 uses the retrained statistical model and/or updated features to update the outputted recommendations. First, management apparatus 210 may retrieve the updated parameters 222 for the statistical model from model repository 236 and/or model-training apparatus 208 and the updated features from feature repository 234 and/or feature-processing apparatus 206. Next, management apparatus 210 may use the updated parameters 222 to generate a set of scores 240 for the recommendations, as well as a ranking 220 of the recommendations by scores 240. For example, management apparatus 210 may use the updated statistical model to produce scores 240 representing the user's predicted likelihood of responding positively to a set of job recommendations and rank the jobs in descending order of likelihood. Thus, a job that is ranked higher has a higher predicted positive response (e.g. click, apply, save, like, etc.) to an impression of the job by the user than a job that is ranked lower.

Management apparatus 210 and/or another component of the system then outputs some or all jobs in ranking 220 as additional recommendations to the user. For example, management apparatus 210 may display some or all jobs according to ranking 220 within a job search tool and/or a website or application for accessing the online professional network. In another example, management apparatus 210 may transmit an email, notification, text message, and/or other communication containing the ranked jobs to the user. Subsequent responses to the recommendations may, in turn, be used to generate events 202 that are fed back into the system and used to update features, the statistical model, and/or the recommendations in a timely manner, as discussed above.

In one or more embodiments, management apparatus 210 uses multiple versions of a statistical model to generate scores 240 and/or ranking 220. For example, management apparatus 210 may obtain updated parameters 222 for a statistical model that is personalized to responses 218 from a certain user and use the personalized statistical model to generate a first set of scores 240. Management apparatus 210 may also obtain a global version of the statistical model that reflects a member segment of the member (e.g., industry, job title, seniority, location, skills, etc.) and use the global version to generate a second set of scores 240. Management apparatus 210 may then calculate a final set of scores 240 as a linear combination of output from the personalized and global versions, generate ranking 220 from the final scores 240, and update the outputted recommendations according to ranking 220. Because the global version tracks the fixed effects of multiple users and the personalized version tracks the random effects of individual users, the combined scores 240 may more accurately predict the users' responses to jobs and/or other recommendations than response prediction techniques that include only fixed effects or random effects.

By concurrently updating features and statistical models based on centralized events 202 containing recent responses 218 to recommendations by users, the system of FIG. 2 may allow the recommendations to reflect the responses on a nearline basis. On the other hand, conventional platforms may incur significant delay during extract, transform, load (ETL) of features into offline data stores and subsequently training models using the features on an infrequent (e.g., daily) basis, which may cause recommendations that contradict recent responses and/or preferences to be shown to users. Consequently, the system may significantly reduce latency associated with model and feature updates and improve the performance of statistical models, model-training pipelines, recommendation systems, and/or other computer systems or technologies that utilize statistical models or features.

Those skilled in the art will appreciate that the system of FIG. 2 may be implemented in a variety of ways. First, event-processing apparatus 204, feature-processing apparatus 206, model-training apparatus 208, management apparatus 210, feature repository 234, model repository 236, and jobs repository 238 may be provided by a single physical machine, multiple computer systems, one or more virtual machines, a grid, one or more databases, one or more filesystems, and/or a cloud computing system. Event-processing apparatus 204, feature-processing apparatus 206, model-training apparatus 208, and management apparatus 210 may additionally be implemented together and/or separately by one or more hardware and/or software components and/or layers.

For example, event-processing apparatus 204, feature-processing apparatus 206, and model-training apparatus 208 may be implemented using one or more stream-processing jobs such as Apache Samza stream processors. Feature repository 234, model repository 236, and jobs repository 238 may include data stores that enable querying and/or update on a real-time or nearline basis. Management apparatus 210 may include and/or form a part of an online-processing system that retrieves the latest model parameters 222 from model repository 236 and features from feature repository 234 and uses the updated models and features to generate and/or modify recommendations that are outputted to users. Because components of the system are loosely coupled and utilize events 202 and event streams 200, instances and/or versions of event-processing apparatus 204, feature-processing apparatus 206, model-training apparatus 208, and/or management apparatus 210 may be added and/or scaled without interfering with the operation of other system components.

Second, a number of statistical models and/or techniques may be used to generate predictions 214, scores 240, and/or ranking 220. For example, the functionality of each statistical model may be provided by a regression model, artificial neural network, support vector machine, decision tree, naïve Bayes classifier, Bayesian network, clustering technique, collaborative filtering technique, hierarchical model, and/or ensemble model.

Finally, the statistical models may be adapted to different types of features, responses, and/or predictions. For example, a combination of global and personalized models and/or multiple stages of ranking and/or scoring may be used to predict user responses to advertisements, products, services, events, activities, classes, games, movies, music, articles, connection recommendations, and/or other items.

Figure 3:
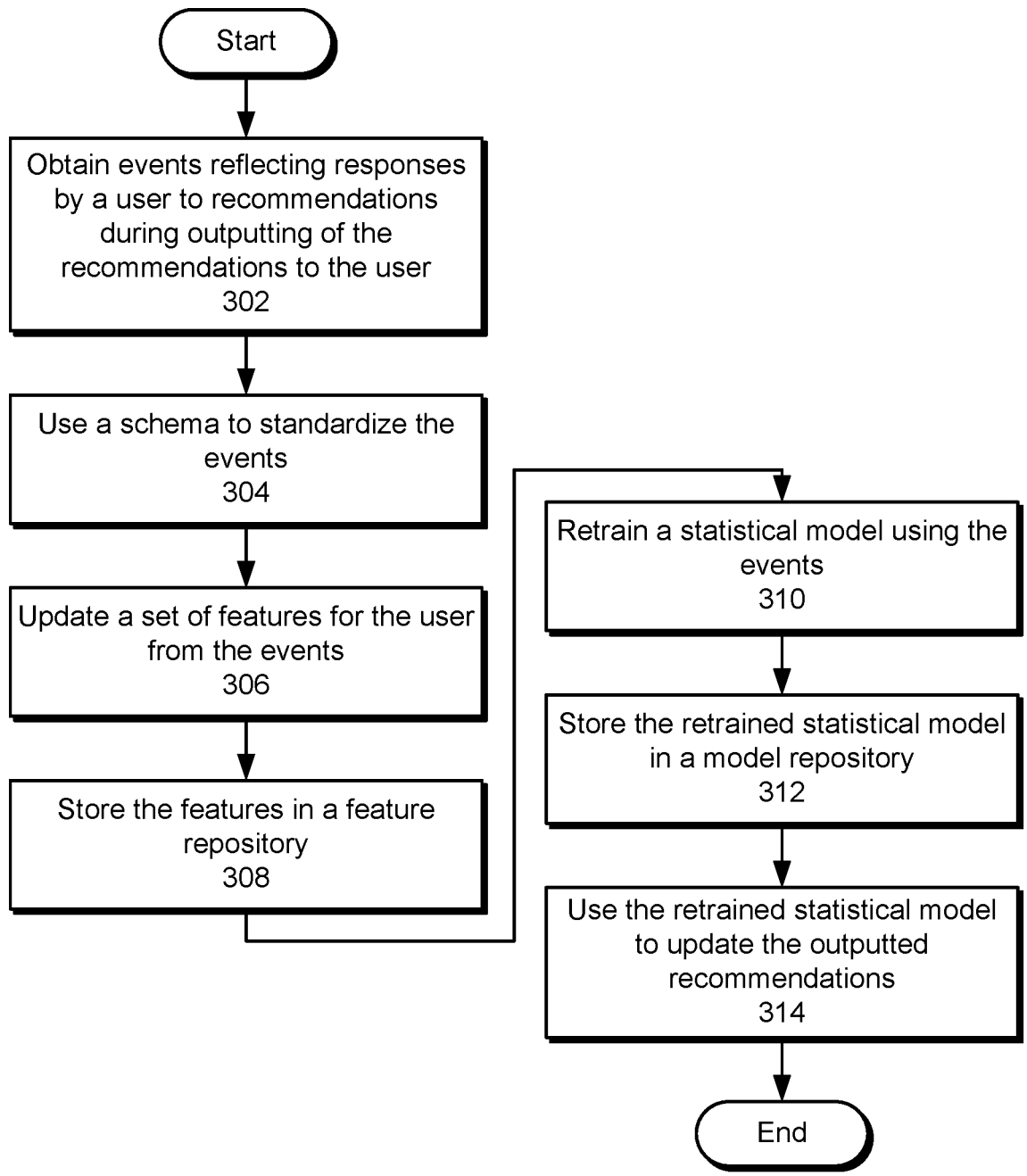
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, events reflecting responses by a user to recommendations are obtained during outputting of the recommendations to the user (operation 302). For example, the events may be generated after the responses are received from the user. The events may then be included in an event stream for retrieval on a nearline basis. The recommendations may include jobs, articles, posts, profile edits, goods, services, events, restaurants, music, and/or other items that are tailored to the user's preferences.

Next, a schema is used to standardize the events (operation 304). For example, the schema may be used to transform events from multiple sources into a set of standardized events with the same set of required fields. An exemplary schema for standardizing events representing responses to job recommendations may include a timestamp representing the time of a response, a user identifier for a user, a job identifier for a job, a response of the user to the job, a reason for the response, and/or a location of the recommended job.

A set of features for the user is then updated from the events (operation 306). For example, the events may be aggregated into counts and/or likelihoods of different responses to various attributes of the recommendations by the user (e.g., applying to a job at a particular location, saving a job with a given seniority, dismissing a job with a certain skill, etc.). The features are also stored in a feature repository (operation 308) for subsequent retrieval and use.

The events and/or features may then be used with a statistical model to generate a ranking of jobs and/or other recommendations for the user. More specifically, the events are used to retrain the statistical model (operation 310), as discussed in further detail below with respect to FIG. 4. For example, the statistical model may be retrained using the events and/or corresponding features independently of updating the features and storing the features in the feature repository.

The retrained statistical model is then stored in a model repository (operation 312) and used to update the outputted recommendations (operation 314). For example, updated coefficients and/or parameters for the statistical model may be retrieved from the model repository on a nearline basis and used to re-score and/or re-rank the recommendations. As a result, output from the retrained statistical model may be reflected in the updated recommendations while the user interacts with the recommendations instead of after a significant delay of hours or days.

Figure 4:
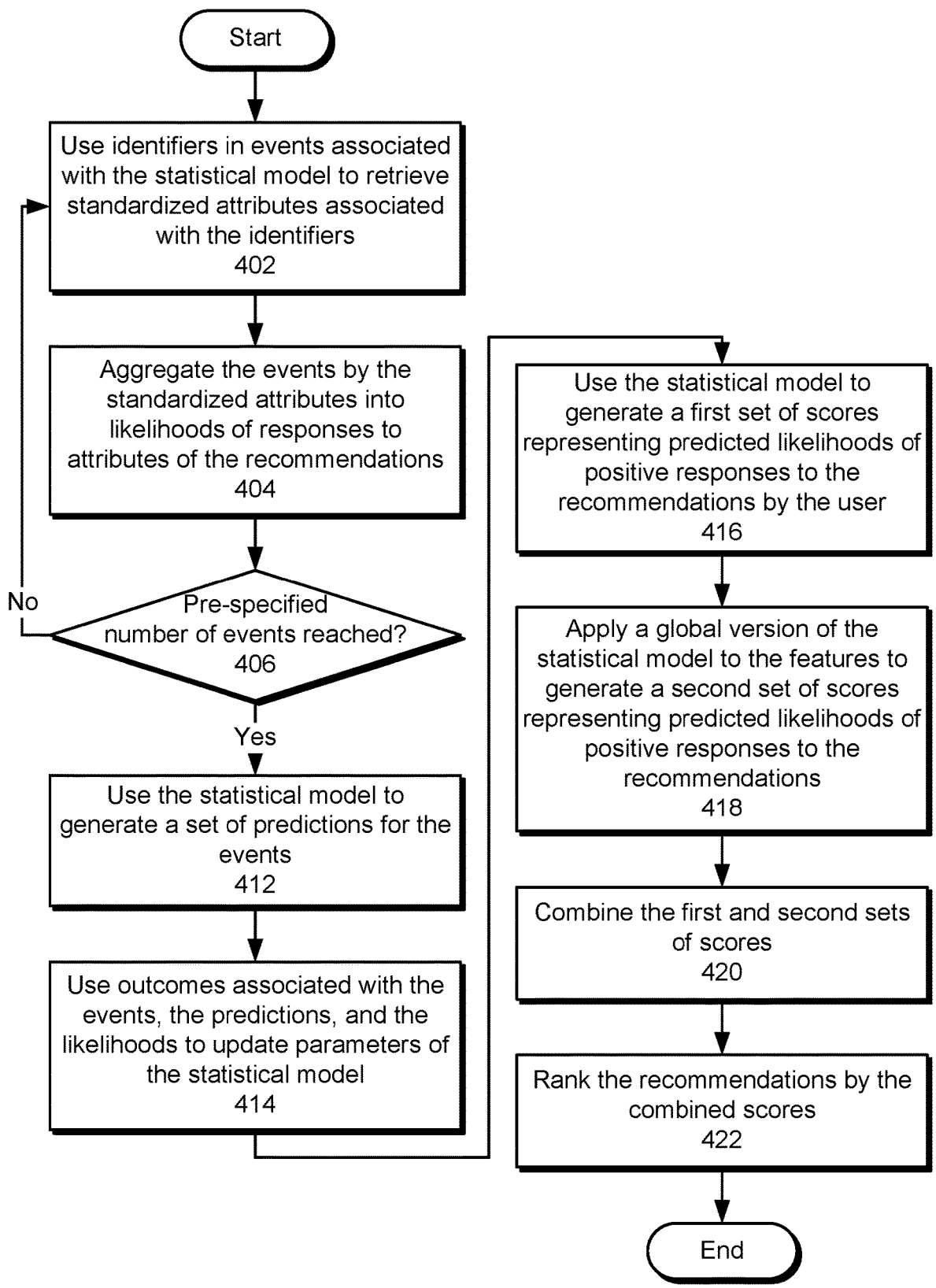
FIG. 4 shows a flowchart illustrating a process of using a statistical model to update a set of recommendations in accordance with the disclosed embodiments.

FIG. 4 shows a flowchart illustrating a process of using a statistical model to update a set of recommendations in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, identifiers in events associated with the statistical model are used to retrieve standardized attributes associated with the identifiers (operation 402). For example, member identifiers and/or job identifiers in events representing user responses to job recommendations may be used to retrieve attributes associated with the corresponding members and/or jobs. The attributes may include, but are not limited to, names, locations, job titles, industries, seniorities, skills, and/or member segments.

Next, the events are aggregated by the standardized attributes into likelihoods of responses to the recommendations (operation 404). For example, the events may be aggregated into counts by member, response type (e.g., view, save, dismiss, apply, etc.), and attribute (e.g., location, job title, industry, seniority, skill, member segment, etc.). The counts may be used to update likelihoods that are calculated by dividing the number of times a member has responded a certain way to a specific attribute by the member's total number of responses to the attribute. The likelihoods may be calculated for the member's responses received over a given period (e.g., the last month or year) or over all time. Operations 402-404 may be repeated until a pre-specified number of events is reached (operation 406). For example, events representing responses to recommendations may be aggregated into likelihoods and/or other features until five responses have been received from a user.

After the pre-specified number of events is reached, the statistical model is used to generate a set of predictions for the events (operation 412). For example, likelihoods and/or other features associated with the recently received responses may be inputted into the statistical model to generate scores representing predicted likelihoods of positive responses by the user to the corresponding recommendations. Outcomes associated with the events, the predictions, and the likelihoods are then used to update parameters of the statistical model (operation 414). For example, the parameters may be adjusted based on differences between the statistical model's predictions and the corresponding outcomes. In other words, the statistical model may be retrained to reflect the user's most recent responses to recommendations.

Once the statistical model is trained or retrained, the statistical model is used to generate a first set of scores representing predicted likelihoods of positive responses to the recommendations by the user (operation 416). A global version of the statistical model is also applied to the features to generate a second set of scores representing predicted likelihoods of positive responses to the recommendations (operation 418). For example, the statistical model and global version may each generate a score between 0 and 1 that represents a predicted propensity of the user in clicking, liking, saving, applying to, and/or otherwise responding positively to a job recommendation.

Finally, the first and second sets of scores are combined (operation 420), and the recommendations are ranked by the combined scores (operation 422). For example, the two sets of scores may be combined with a set of weights to produce a final set of scores, and the recommendations may be ranked in descending order of final score. The recommendations may then be displayed and/or otherwise outputted according to the ranking, so that recommendations with a higher likelihood of positive response are outputted before recommendations with a lower likelihood of positive response.

Figure 5:
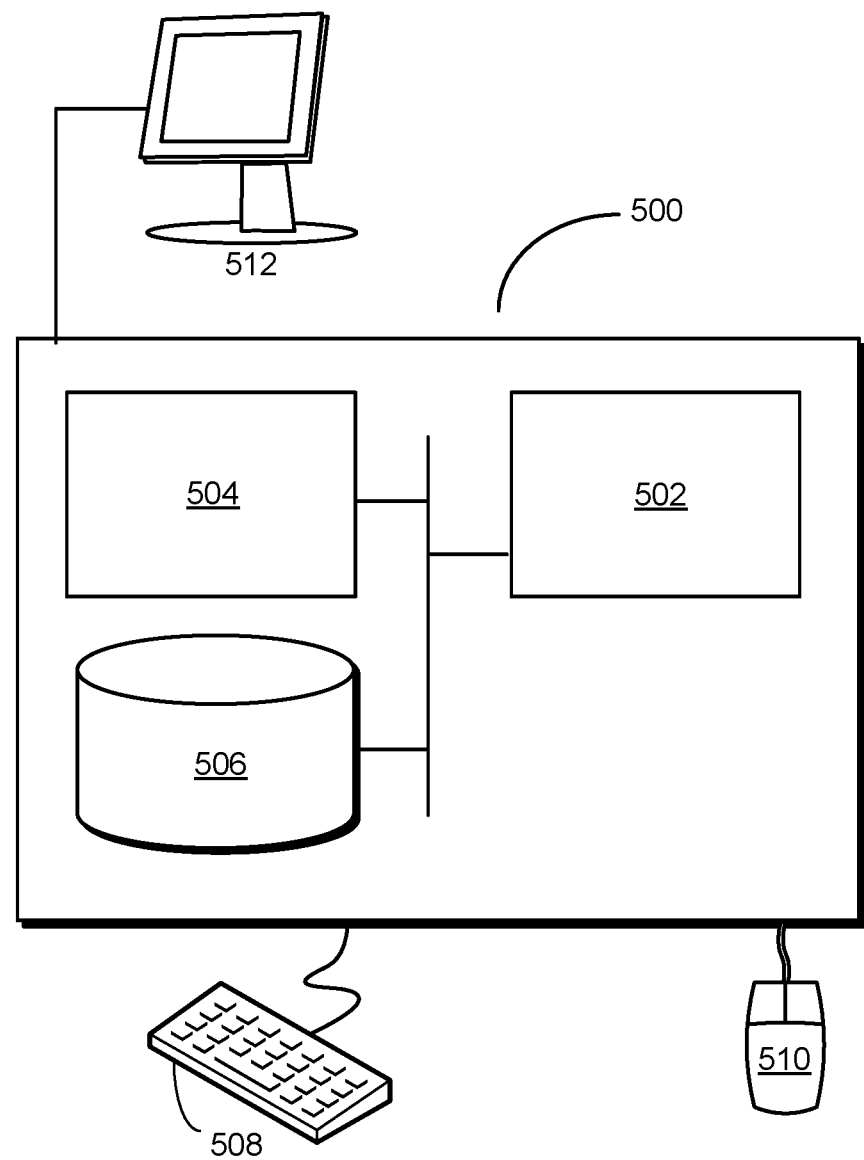
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system includes an event-processing apparatus, a feature-processing apparatus, and a model-training apparatus, one or more of which may alternatively be termed or implemented as a module, mechanism, or other type of system component. The event-processing apparatus may obtain events reflecting responses by a user to recommendations (e.g., job recommendations) during outputting of the recommendations to the user. The feature-processing apparatus may update a set of features for the user from the events and include the updated set of features in a feature repository. The model-training apparatus may then retrain a statistical model using the set of events before the statistical model is used to update the outputted recommendations.

In addition, one or more components of computer system 500 may be remotely located and connected to the other components over a network. Portions of the present embodiments (e.g., event-processing apparatus, feature-processing apparatus, model-training apparatus, management apparatus, feature repository, model repository, jobs repository, etc.) may also be located on different nodes of a distributed system that implements the embodiments. For example, the present embodiments may be implemented using a cloud computing system that performs nearline updating of statistical models and features to predict the responses of a set of remote users to a set of recommendations.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining events reflecting responses by a user to past recommendations outputted to the user, the events including data indicating a timestamp, a user identifier of the user, an identifier of a past recommendation of the past recommendations, and an action of actions by the user regarding the past recommendation;
    updating, by one or more computer systems, a set of features for the user from the events, the features including counts for the events, the events aggregated by member identification, action, and recommendation identifier;
    generating likelihood features for the aggregated features based on the counts, the likelihood features representing an empirical likelihood that the user performs an action of the actions in response to next recommendations;
    storing the updated set of features and the generated likelihood features in a feature repository for use by a statistical model in generating a ranking of the next recommendations for the user; and
    retraining, by the one or more computer systems, the statistical model using the likelihood features and the updated features prior to using the statistical model to update the next recommendations using the ranking.

2. The method of claim 1, further comprising:
    using a schema to standardize the events prior to generating the set of updated features from the events.

3. The method of claim 2, wherein the event further comprises:
    a reason for the response, and
    a location associated with the recommendation.

4. The method of claim 1, wherein updating the set of features from the events comprises:
    using the user and past recommendation identifiers in the events to retrieve standardized attributes associated with the identifiers; and
    aggregating the events by the standardized attributes into the empirical likelihoods of the action in response to the next recommendations.

5. The method of claim 4, wherein the standardized attributes comprise at least one of:
    a job title;
    a company;
    a skill;
    a location;
    an industry;
    a seniority; and
    a member segment.

6. The method of claim 1, wherein using the statistical model to update the next recommendations using the ranking comprises:
    generating, by the statistical model using the updated set of features, a first set of scores representing predicted likelihoods of positive responses to the next recommendations by the user; and
    ranking the next recommendations by the first set of scores.

7. The method of claim 6, wherein using the statistical model to update the next recommendations using the ranking further comprises:
    applying a global version of the statistical model to the set of features to generate a second set of scores representing predicted likelihoods of positive responses to the next recommendations; and
    combining the first and second sets of scores prior to ranking the next recommendations.

8. The method of claim 1, wherein retraining the statistical model using the updated set of features comprises:
- after a pre-specified number of the events is received for the user, using the statistical model to generate a set of predictions for the pre-specified number of the events; and
- using the actions associated with the events, the set of predictions, and the updated set of features to update parameters of the statistical model.

9. The method of claim 1, further comprising:
- storing the retrained statistical model in a model repository for subsequent use in updating the next recommendations.

10. The method of claim 1, wherein the actions comprise:
- viewing a recommendation;
- saving the recommendation;
- dismissing the recommendation; and
- applying to a job represented by the recommendation.

11. The method of claim 1, wherein the events are obtained from an event stream by one or more stream processors.

12. The method of claim 11, wherein the one or more stream processors are configured to update the set of features from the events and retrain the statistical model using the events on a nearline basis.

13. A method, comprising:
- obtaining events reflecting responses by a user to past recommendations outputted to the user, the events including data indicating a timestamp, a user identifier of the user, an identifier of a past recommendation of the past recommendations, and an action of actions by the user regarding the past recommendation;
- updating, by one or more computer systems, a set of features for the user from the events, the features including counts for the events, the events aggregated by member identification, action, and recommendation identifier;
- generating likelihood features for the aggregated features based on the counts, the likelihood features representing an empirical likelihood that the user performs an action of the actions in response to next recommendations;
- storing the updated set of features and the generated likelihood features in a feature repository, and
- retraining, by the one or more computer systems, a statistical model using the set of updated features and the generated likelihood features prior to using the statistical model to update the next recommendations.

14. The method of claim 13, wherein using the statistical model to update the set of outputted recommendations comprises:
- generating, by the statistical model using the updated set of features, a first set of scores representing predicted likelihoods of positive responses to the next recommendations by the user;
- ranking the next recommendations by the first set of scores; and
- outputting the next recommendations according to the ranking.

15. The method of claim 14, wherein using the statistical model to update the set of outputted recommendations further comprises:
- applying a global version of the statistical model to the set of features to generate a second set of scores representing predicted likelihoods of positive responses to the next recommendations by the user; and
- combining the first and second sets of scores prior to ranking the next recommendations.

16. The method of claim 13, wherein retraining the statistical model using the updated set of features comprises:
- after a pre-specified number of the events is received for the member, using the statistical model to generate a set of predictions for the pre-specified number of the events; and
- using the actions associated with the events, the set of predictions, and the updated set of features to update parameters of the statistical model.

17. A non-transitory computer-readable storage medium storing instructions that when executed by a computer cause the computer to perform a method, the method comprising:
- obtaining events reflecting responses by a user to past recommendations outputted to the user, the events including data indicating a timestamp, a user identifier of the user, an identifier of a past recommendation of the past recommendations, and an action of actions by the user regarding the recommendation;
- updating a set of features for the user from the events the features including counts for the events, the events aggregated by member identification, action, and recommendation identifier;
- generating likelihood features for the aggregated features based on the counts, the likelihood features representing an empirical likelihood that the user performs an action of the actions in response to next recommendations;
- store the updated set of features and the generated likelihood features in a feature repository for use by a statistical model in generating a ranking of the next recommendations for the user; and
- retraining the statistical model using the updated set of features and the generated likelihood features prior to using the statistical model to update the next recommendations using the ranking.

18. The non-transitory computer-readable storage medium of claim 17, wherein retraining the statistical model using the updated set of features comprises:
- after a pre-specified number of the events is received for the member, using the statistical model to generate a set of predictions for the pre-specified number of the events; and
- using the actions associated with the events, the set of predictions, and the one or more generated likelihoods of the responses to update parameters of the statistical model.

* * * * *